United States Patent [19]
Zittel et al.

[11] Patent Number: 6,095,035
[45] Date of Patent: Aug. 1, 2000

[54] DUAL DRUM FOOD PROCESSOR

[75] Inventors: David R. Zittel, Columbus; Steven W. Hughes, Beaver Dam, both of Wis.

[73] Assignee: Lyco Manufacturing, Inc., Columbus, Wis.

[21] Appl. No.: 09/222,970

[22] Filed: Dec. 30, 1998

[51] Int. Cl.[7] .............................. A23L 3/00; A23N 12/00; A47J 37/12; F25D 25/02

[52] U.S. Cl. ............................ 99/348; 99/355; 99/404; 99/409; 99/443 C; 99/470; 99/517; 134/65; 134/132; 366/234; 366/291; 366/301; 366/318

[58] Field of Search ............................ 99/348, 353–355, 99/360, 365, 403, 404, 409, 450, 470, 483, 487, 516, 517, 534, 536, 477–479, 443 R, 443 C; 366/290–292, 297–301, 318, 234, 319, 322, 324; 134/65, 132; 62/381; 100/117, 145

[56] References Cited

U.S. PATENT DOCUMENTS

| | | |
|---|---|---|
| 4,875,344 | 10/1989 | Zittel ......................................... 62/381 |
| 4,979,434 | 12/1990 | Van Lengerich ........................... 99/353 |
| 5,332,103 | 7/1994 | Zittel ........................................ 209/664 |
| 5,351,609 | 10/1994 | Muntener ................................... 99/485 |
| 5,353,696 | 10/1994 | Stadelmann et al. ................ 99/348 X |
| 5,433,849 | 7/1995 | Zittel ........................................ 210/324 |
| 5,450,786 | 9/1995 | Muntener .............................. 99/348 X |
| 5,456,091 | 10/1995 | Zittel ......................................... 62/375 |
| 5,518,614 | 5/1996 | Zittel ........................................ 210/403 |
| 5,550,927 | 8/1996 | Zittel et al. ............................. 382/110 |
| 5,587,073 | 12/1996 | Zittel ........................................ 210/372 |
| 5,780,088 | 7/1998 | Zittel et al. ............................. 426/483 |
| 5,809,787 | 9/1998 | Zittel ........................................... 62/63 |

*Primary Examiner*—Timothy Simone
*Attorney, Agent, or Firm*—Nilles & Nilles SC

[57] ABSTRACT

A food processing apparatus is disclosed that has a tank with an inlet end and an outlet end. The apparatus has at least two rotary drums received within an interior chamber of the tank, each communicating with the inlet end for urging a food product from the inlet end simultaneously through the drums to the outlet end. A liquid is held at a desired level within the interior chamber. Each of the rotary drums is submerged in the liquid to a predetermined depth. The food processor of the present invention is particularly well suited for increasing the food product volume capacity for particular foods which can only be passed through the drums at a relatively low product level within each drum.

12 Claims, 4 Drawing Sheets

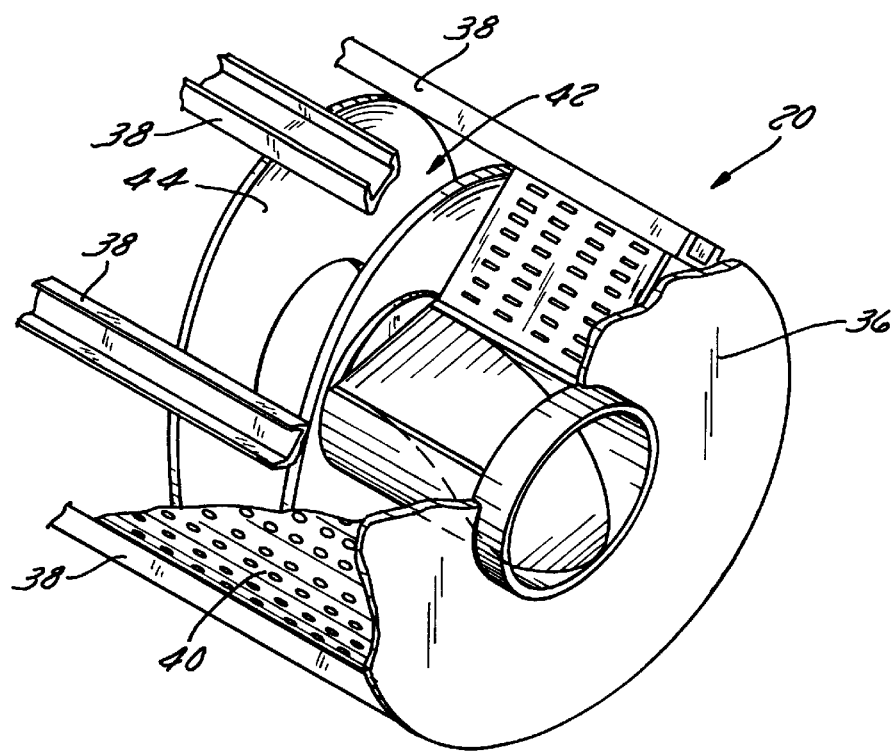
FIG. 2
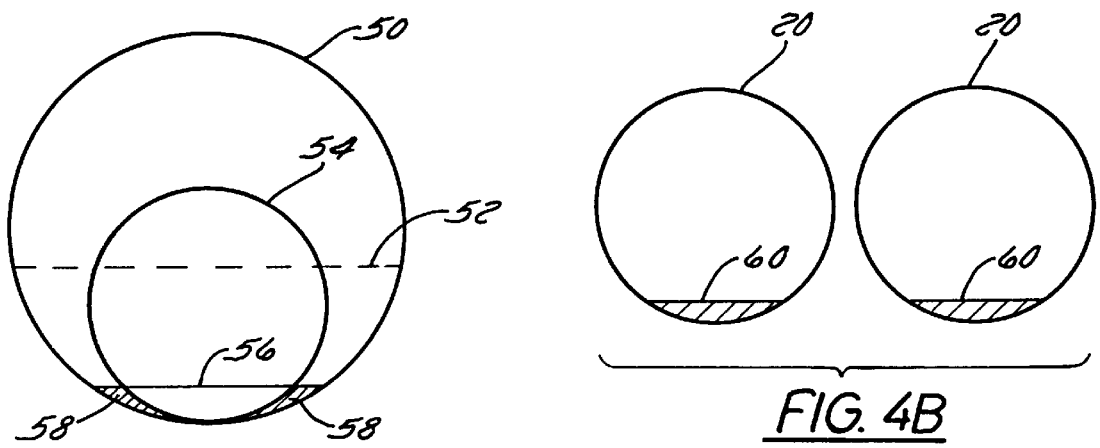
FIG. 4A
FIG. 4B

DUAL DRUM FOOD PROCESSOR

BACKGROUND OF THE INVENTION

1. Field of the Invention

The present invention relates generally to rotating perforated drum food machinery, and more particularly to a food processor having a dual rotating drum arrangement.

2. Description of the Related Art

Commercial quantities of a food product such as pasta, green peas, corn, beans or other such food products are often processed in rotating drum blanchers or coolers. These machines typically employ a cylindrical drum formed utilizing a perforate stainless steel sheet which rotates within a water filled tank. The cylindrical drum has a helical auger therein which advances or urges the food product in a continuous fashion from an inlet end of the drum to an outlet end.

Certain types of food product such as lasagna noodles are larger and more fragile or delicate than other products. Lasagna noodles, for example, are about 2 inches wide and about 7 inches long and have ruffled edges along their sides. Lasagna noodles are also of a relatively fragile or delicate nature such that they can become torn or otherwise damaged if subjected to an external force such as a mechanical agitation force. This type of product typically can run at a depth of no more than about 4 inches within the drum. The relative large size, greater mass and delicate nature of such noodles causes damage to the product or clogs up the drum when run at depths greater than 4 inches. The terms "fragile" and "delicate" used herein are intended to generally impart that the food product is susceptible to some type of damage during processing.

A conventional food processor utilizes a single rotating drum typically made having a large diameter and a long length in order to process enormous quantities of food product over a given time. As with most industries, simultaneous improved quality and increased quantity and efficiency are important goals. For most types of food products, using a larger diameter and longer length drum is more than adequate to gain a tremendous volume increase for food processing. For example, drums today are as large or larger than 72 inches in diameter and 28 feet in length. Many types of food products can run at depths as high as 21 inches within the drum.

Because larger, odd shaped and delicate products such as lasagna noodles can create processing problems when run at depths upward of 4 inches, the product volume within the drum cannot be easily increased by simply enlarging the cylinder. Regardless of how large or how long the drum is made, the amount of volume increase for the processing of certain products such as lasagna noodles can increase only about 9% for every 12 inch diameter increase. A point of diminishing returns is reached wherein the equipment becomes excessively large and expensive and takes up too much floor space without a corresponding gain in production volume.

SUMMARY OF THE INVENTION

The present invention provides an improved processor that accommodates odd shaped, delicate and larger food products such as lasagna noodles and yet permits a substantial increase in volume processing efficiency for such a product. The present invention is directed to a dual drum food processing apparatus that runs two parallel drums wherein each drum accommodates a 4 inch depth of food product such as lasagna noodles. Each drum is relatively small in diameter and length when compared to a large volume food processor of a single drum construction and yet can produce a vast volume increase for certain products over a single drum construction.

One advantage of the present invention is that the food processor permits a much higher potential volume increase for odd shaped, delicate and large food products such as lasagna noodles. Another advantage of the present invention is that the food processor provides the potential substantial volume increase without requiring an excessive increase in equipment size and cost. A further advantage of the present invention is that the food processor does not require a large material outlay or power input in order to produce the substantial volume increase. An additional advantage of the present invention is that the food processor permits the substantial volume increase and yet requires less lineal foot of floor space. A still further advantage of the present invention is that the food processor is much less expensive to manufacture than a single drum unit having a very large diameter and long length drum because the apparatus uses two smaller drums thereby simplifying the manufacturing process for each drum.

In order to accomplish these and other objects, features and advantages of the present invention, in one embodiment a food processor has a tank with an inlet end and an outlet end. A pair of rotary drums are received adjacent one another within the tank. Each of the drums communicates with the inlet end for receiving a food product therein and for urging the food product from the inlet end simultaneously through the drums to the outlet end.

In one embodiment, the food processing apparatus is adapted for use as a high volume blanching apparatus. In another embodiment, the food processing apparatus is a high volume chilling apparatus.

In one embodiment, each of the rotary drums of the food processing apparatus includes a shaft defining an axis about which the drum rotates. A helical auger extends axially along and radially outward from the shaft of each drum for urging the food product within the drum from the inlet end to the outlet end of the tank. A perforate metal skin extends along the drum and surrounds the auger whereby the skin permits fluid within the tank to flow into and out of the drum while retaining the food product within the drum.

In one embodiment, each of the rotary drums is arranged parallel relative to the other. In another embodiment, the food processing apparatus includes more than two rotary drums received within the tank.

In one embodiment, each of the rotary drums has a diameter of less than 50 inches and a length of less than 10 feet. In another embodiment, each of the rotary drums has a diameter of about 48 inches and a length of about 9 feet.

In one embodiment, the tank of the food processing apparatus further comprises a cavity for holding a liquid within the tank wherein each of drums is partly submersed within the liquid to a depth of no more than about 4 inches. In another embodiment, the chamber within the tank includes a recessed partial cylindrical section for each rotary drum wherein each recessed cylindrical section follows the contour of its respective rotary drum.

In one embodiment of the invention, a method of increasing a production volume of a food processing apparatus which is utilized to process bulk quantities of a food product having a relatively large size and delicate nature includes first providing a tank having an inlet end, an outlet end, and a liquid within the tank. A first rotary drum is then arranged within the tank. A second rotary drum is arranged within the tank adjacent the first rotary drum. A food product is then delivered to the inlet end of the tank and into each of the rotary drums at one end. Each of the rotary drums is then rotated about a generally horizontal axis to urge the food product from the inlet end to the outlet end of the tank through each drum simultaneously.

Further objects, features and advantages of the invention will become apparent to those skilled in the art from the following detailed description when taken in conjunction with the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

FIG. 2 illustrates a fragmentary partial cross-section of a portion of one of the cylindrical drums in FIG. 1;

FIGS. 4A and 4B illustrate a schematic comparison of a conventional large diameter single drum construction and the dual drum construction of the invention with respect to volume efficiency.

DETAILED DESCRIPTION OF THE PREFERRED EMBODIMENT

Figure 1:
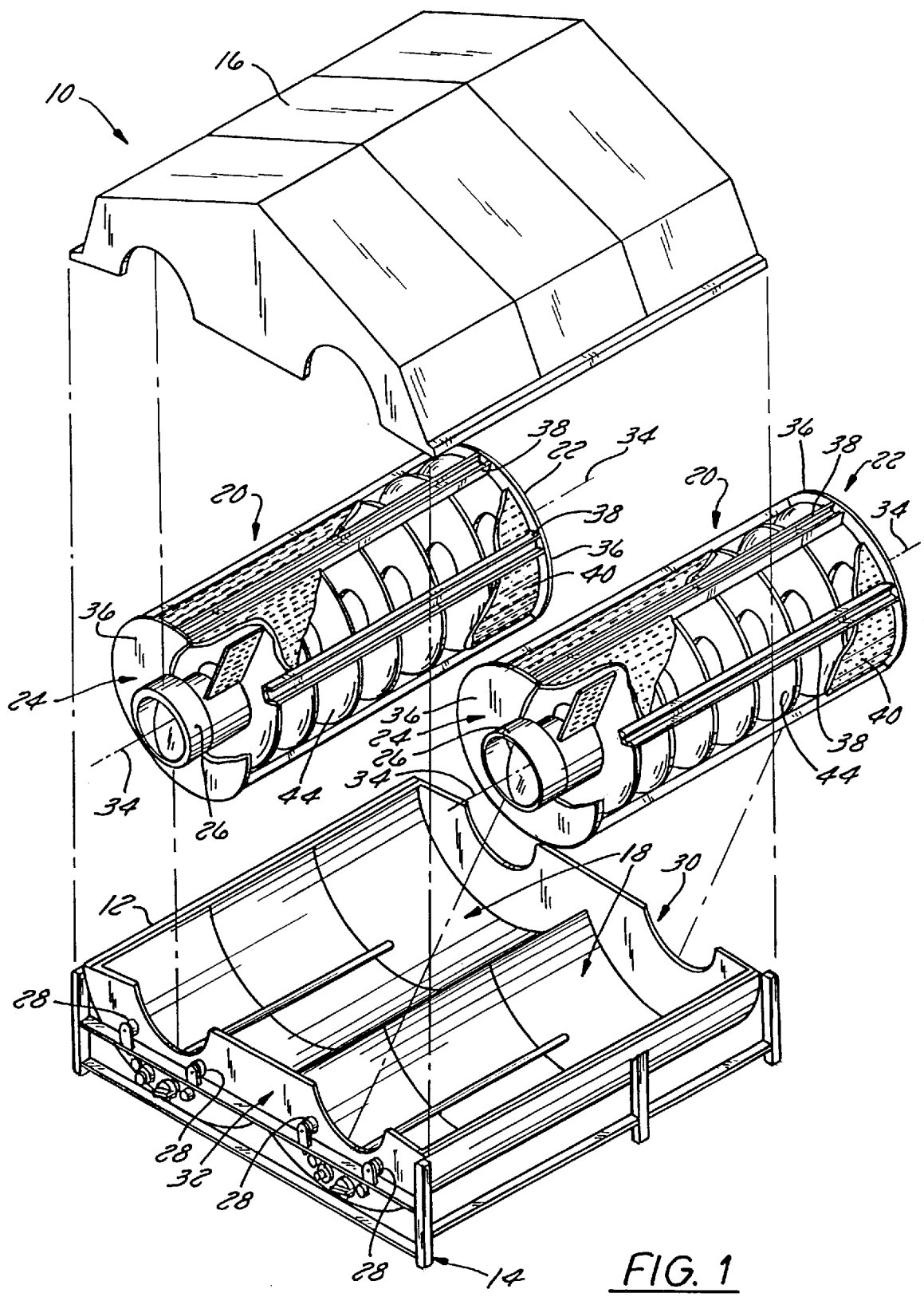
FIG. 1 illustrates an exploded isometric view of a dual drum food processor constructed according to the present invention.

Referring now to the drawings, FIG. 1 illustrates a food processing apparatus 10 which may be in the form of a food blancher for treating a food product at elevated temperatures or a food chiller for treating a food product at substantially cooled temperatures. Herein, the apparatus will be described as the processor 10 for simplicity of description.

The processor 10 includes generally a tank 12 supported by a frame structure 14 wherein the tank is adapted to hold an amount of water or other treating liquid at a desired level within the tank 12. A tank cover 16 is removably received over the tank 12 and defines a substantially enclosed interior chamber 18 within the processor 10 and can be adapted to retain the water or liquid, any vapor, and a food product within the tank. The cover 16 encloses the interior chamber 18 and can be adapted to sustain therein a particular environment which is different from the surrounding ambient environment. The processor 10 also includes at least two channels or passages that pass through the tank 12. The food product is urged or otherwise moved along the channels or passages in the interior chamber 18.

In one embodiment, a pair of drums 20 define the channels or passages and are supported by the tank 12 within the interior chamber 18. The drums 20 rotate in order to urge food product through the processor 10 for treating the food product passing along the drums. In the present embodiment, the drums 20 are each a rotatable cylinder having an inlet end 22 and an outlet end 24. A cylindrical journal 26 extends axially from each drum 20 at each end, though only the journals 26 of the outlet ends 24 are illustrated in FIG. 1. Each journal 26 is supported by a pair of trunnions 28 carried both at a corresponding inlet end 30 and outlet end 32 of the tank 12. The drums 20 are rotatable about an axis 34 which extends longitudinally along each of the drums. Each of the drums is driven by a motor (not shown) through a mechanical linkage (not shown) in order to rotate the drums as desired.

Figure 3:
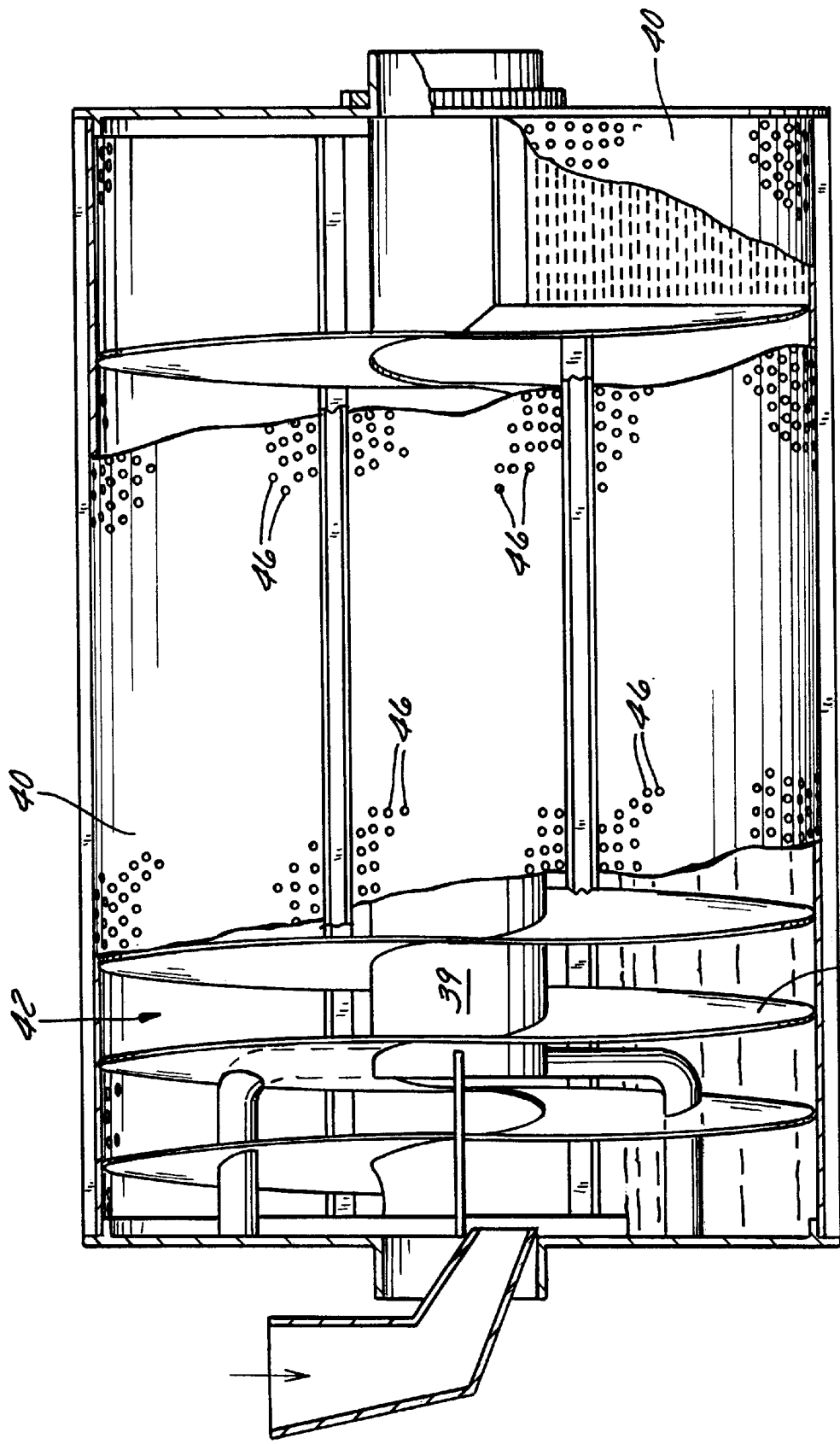
FIG. 3 illustrates a side view in cross-section of the drum in FIG. 2.

Each drum 20 can be formed in any conventional manner, or can be formed according to the construction disclosed in U.S. Pat. No. 5,146,841, issued to Zittel. One of many possible embodiments of the drum and the support and mounting components is disclosed herein in order to simplify the description of the invention although other embodiments and constructions fall within the scope of the present invention. Referring to FIGS. 1–3, each drum 20 has a spun stainless steel end plate 36 disposed at each end. A plurality of support members 38 extend axially along the drum 20 spaced from a central drum shaft 39 between the end plates 36 and are connected in any suitable manner to the peripheral edges of each plate.

Each of the drums 20 has an exterior peripheral surface defined by a plurality of perforate sheet metal skins or panels 40. Each of the panels 40 is attached or interconnected to the support members 38 to define an interior cavity 42 within each drum. In one embodiment, a helical auger 44 extends radially from the shaft 39 and axially along the drum from the input end 22 to the output end 24. The auger 44 is adapted to urge a food product along the drum as each drum rotates. Each panel 40 includes a plurality of openings or perforations 46 to permit the liquid or water in the tank to freely flow between the drums and the tank.

In conventional designs, a typical processor includes a single drum extending along the tank. A primary goal of the invention is to process as much food product as is feasible over a given time.

It has in the past been desirable to produce a drum as long as possible and having a diameter as large as possible. For example, 28 foot long and 9 foot diameter drums are known in the art. Such a single drum construction is satisfactory for processing most food products which are not affected or damaged when moved through the drum in large quantities and at substantial depths relative to the drum cross-section. However, certain food products such as lasagna noodles are relatively delicate and fairly large so that the amount of food product that can be moved through the drum at any given time is fairly limited. Refer to FIG. 4 and the more detailed discussion relating thereto that is provided below.

Other embodiments are possible where an auger 44 is utilized with no perforate panels 40 or support members 38. The auger would simply run adjacent a correspondingly contoured surface of the tank 12 to urge the food product through the processor. No actual "drum" construction as described above would exist in such an embodiment. Other alternatives are possible wherein a means other than an auger is utilized to urge the food product through the processor channels or passages.

In operation, a food product is introduced into the inlet end 22 of each drum. Each drum is mounted to the tank so that a portion of each drum is partially submerged in the liquid of the tank 12 at a predetermined depth. The auger 44 rotates about the axis 34 of each drum 20 and shaft 39 and advances the food product along the drum to the outlet end 24. The food product is held within the drums 20 by the perforate panels 40 although the perforations 46 permit the liquid within the drum to pass freely between the drum and the tank cavity 18. The liquid is maintained at a desired temperature in order to chill or to blanch the food product. The liquid circulates between the tank cavity 18 and the interior drum cavity 42 while the food product is retained within the drum by the panels.

The processor 10 is typically employed in high volume food processing operations and is run continuously to treat thousands of pounds of food product over a relatively short duration. The more food product that can be processed through the machine in a given amount of time, the higher the efficiency of the processor 10. It is therefore desirable to increase the efficiency of the processor 10. As discussed above, this has previously been done by increasing the drum size of the single drum processor in order to move more food product along the processor. For most food products, the drum can carry significantly high depths or levels when viewed in cross-section as shown in FIG. 4A. Thus, the larger the diameter and length of the single drum, the more food product that can be moved through the drum.

A significant problem arises when the food product is of such a nature that it cannot be layered to any significant depth without becoming damaged by the weight of the upper layers of food product. For such food product, such as large, relatively delicate lasagna noodles, the depth of food product within the drum must be kept at a sufficiently low level in order to prevent the mass of the noodles on top from damaging the noodles below.

FIG. 4A illustrates a single drum 50 of a conventional prior construction in schematic view. The drum 50 has a diameter, for example, of 72 inches which is known in the art. The length of the drum may vary but in some instances can be as long as 28 feet for modern food processors. Most types of food product can be run within such a large drum 50 at a relatively high level such as about 21 inches of depth as illustrated by the phantom line 52. As will be evident upon a review of FIG. 4A, a significant increase in the length and depth of the drum 50 results in a substantial increase in the volume of food product that can pass through the drum because of the relatively large permissible depth of 21 inches.

FIG. 4A also illustrates schematically and for purposes of illustration only, a smaller drum 54 having a diameter of 48 inches superimposed over the larger drum 50. This is shown to illustrate the problem associated with processing certain problematic food products such as lasagna noodles.

A typical lasagna noodle can be about 2 inches wide and about 7 inches long and has ruffled edges. Lasagna noodles are made out of a conventional pasta composition and are therefore relatively fragile and susceptible to tearing if exposed to significant external forces. Because of the delicate nature of this type of food product, the food product cannot be run at a depth within the drum of greater than about 4 inches, regardless of the drum diameter. As is illustrated in FIG. 4A, a line 56 within the drum 54 represents a 4 inch depth of food product. Utilizing conventional thinking, if one wanted to increase the volume of food product processed, a larger diameter drum such as the drum 50 would be utilized. However, as can be seen in FIG. 4A, since the depth of the particular food product must remain at 4 inches, the increase in volume is unsatisfactory. Two shaded areas 58 represent the only volume increase of food product within the drum 50. By increasing the diameter of the drum, only about a 9% increase of processed food product is achieved for every 12 inches of diameter increase.

Obviously, a point of diminishing returns is reached where the machinery utilized to process a food product such as lasagna noodles becomes too large, expensive and unwieldy without obtaining a corresponding benefit. The present invention is directed to a novel solution to this problem in the food processing industry and is illustrated schematically in FIG. 4B as well as in FIG. 5. The invention provides two or more cylinders or drums 20 disposed within the tank 12 wherein each of the drums has a smaller diameter than a conventional drum.

In one embodiment, dual 48 inch drums are arranged parallel and side by side and are used to replace a single 72 inch drum. Each of the 48 inch drums can be of equal length relative to one another and either shorter or the same length as the 72 inch drum. The 4 inch level of food product is represented by a line 60 in FIG. 4B. Utilizing such an example, two smaller 48-inch diameter drums 20 provide about 40% more capacity per foot of length of drum than a conventional 72 inch single drum construction. A significant volume increase is thus accomplished utilizing the same or less lineal foot of space in a manufacturing area.

A further advantage of the present invention is that producing cylinders or drums of smaller diameter is much less costly. This is because the smaller drums require less material, manufacturing space and specialized handling than would a much larger size drum. Though the present invention discloses utilizing a pair of side by side or horizontally adjacent cylindrical drums 20, other constructions are possible wherein the drums are oriented differently. For example, the cylindrical drums 20 can be arranged one over the other or in a non-parallel configuration. Alternatively, the cylindrical drums 20 can be arranged relative to one another wherein neither of the drums are horizontally or vertically adjacent one another, but instead offset vertically and horizontally if viewed in the cross-section. Such a construction would require an unconventional tank design to provide the appropriate liquid level for each drum, but falls within the scope of the invention. Further, three or more smaller diameter drums can also be utilized without departing from the spirit and scope of the invention.

Figure 5:
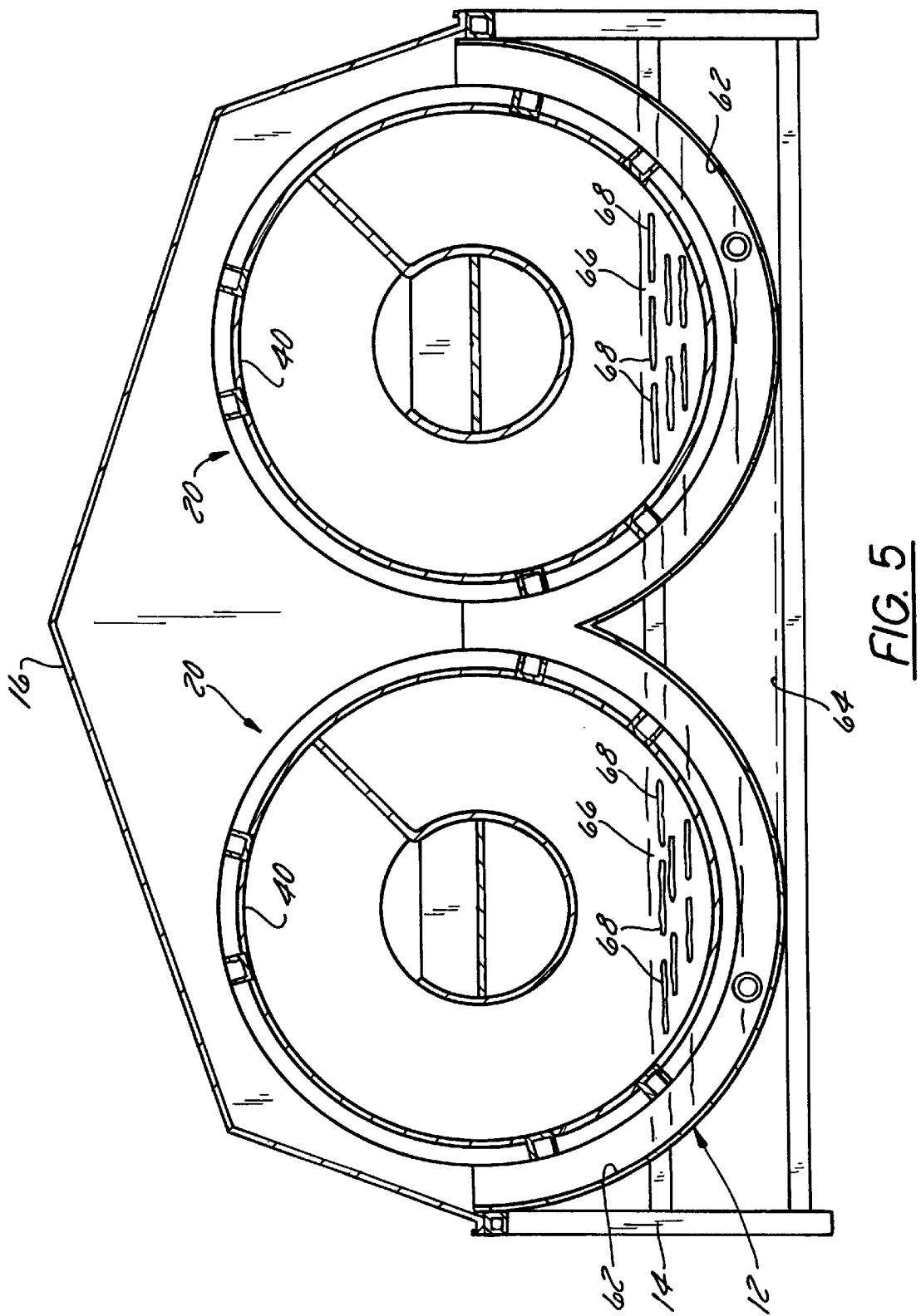
FIG. 5 illustrates a front elevational and fragmentary cross-sectional view of the food processor in FIG. 1.

FIG. 5 illustrates a partial cross-sectional end view of the processor 10. The tank 12 can be designed so that the interior chamber 18 includes a partial cylinder recessed section 62 for each drum 20 that closely follows the contour of each individual drum as shown in FIG. 5. Alternatively, the tank can simply include a single chamber 18 defined by a straight tank bottom which is illustrated by the phantom line 64. The tank construction can vary considerably without departing from the scope and spirit of the present invention. The construction of the tank will depend upon the orientation and arrangement of the cylindrical drums 20 as well as the number of drums. The configuration of the tank 12 will also depend upon the type of fluid utilized for the blanching or cooling of the food product. The tank 12 is constructed in order to provide the proper submersion depth of each cylindrical drum 20 in the liquid but may otherwise vary in construction considerably.

A liquid 66 is illustrated within the interior chamber 18, and in a preferred embodiment the liquid is water as is conventionally used in most food processing machinery. Other liquids, steam or other vapors can also be utilized either alone or in combination in the food processor. A food product 68 is also shown in FIG. 5 for illustration purposes. The food product described herein is lasagna noodles, although other food products also require such low volume or special handling. Examples of such food products are filled ravioli, filled cheese products, or certain pouched food products.

The present invention is not to be limited by the type of materials utilized to construct either the cylindrical drums 20 or the tank 12, cover 16 or other components of the processor 10. Any or all of the components can be made from stainless steel or other suitable metals or alternatively can be made from composite plastics, thermoplastics or the like. The invention is further not to be limited to the particular drum construction or the mounting and supporting arrangement described herein. Further, the invention is not to be limited to the particular frame construction briefly described herein.

The present invention is not to be limited to a particular type of processor such as a blancher or cooler. The processor can also be a combination cooker and cooler or the like. The present invention is also not to be limited to a particular processor construction such as a negative pressure chiller or blancher and alternatively is useful for positive pressure cookers as well.

It is understood that the invention is not limited to the particular drum or tank construction and arrangement of parts herein illustrated and described, but embraces such modified forms thereof as fall within the scope of the following claims.

What is claimed is:

1. A food processing apparatus comprising:
   a tank having an inlet end and an outlet end; and
   a pair of transport passages within the tank and arranged axially adjacent and spaced from one another, each communicating with the inlet end for urging a food product from the inlet end simultaneously through the passages to the outlet end, each of the pair of passages is a rotary drum comprising:
      a shaft defining an axis about which the drum rotates;
      a helical auger extending axially along and radially outward from the shaft for urging food product within the drum from the inlet end to the outlet end of the tank; and
      a perforate metal skin extending along the drum and surrounding the auger permitting a fluid held within the tank to flow into and out of the drum while retaining the food product within the drum.

2. The food processing apparatus according to claim 1 adapted for use as a blanching apparatus.

3. The food processing apparatus according to claim 1 adapted for use as a chilling apparatus.

4. The food processing apparatus according to claim 1 wherein each axis of the rotary drums is arranged horizontally adjacent and parallel relative to one another.

5. A food processing apparatus for processing a food product of a relatively large size and delicate nature, the apparatus comprising:
   a tank having an inlet end, an outlet end, and an interior chamber;
   a liquid received within the tank and defining a liquid level in the interior chamber; and
   at least two rotary drums received within the interior chamber, each of the drums having an axis of rotation and being adapted to receive the food product from the inlet end and urge the food product toward the outlet end of the tank, and each of the drums partly submerged in the liquid to a predetermined depth.

6. The food processing apparatus according to claim 5 wherein the food product comprises bulk quantities of lasagna noodles.

7. The food processing apparatus according to claim 5 wherein each of the drums further comprises:
   a shaft defining the generally horizontal axis about which the drum rotates;
   a helical auger extending along and radially outward from the shaft for urging the food product toward the outlet end of the tank; and
   a perforate metal skin extending along the drum surrounding the auger for retaining the food product within the drum and for permitting the liquid within the interior chamber to flow into and out of the drum to contact the food product.

8. The food processing apparatus according to claim 5 wherein each of the pair of rotary drums has a diameter of less than 50 inches and a length of less than 10 feet.

9. The food processing apparatus according to claim 5 wherein each of the pair of rotary drums has a diameter of about 48 inches and a length of about 9 feet.

10. The food processing apparatus according to claim 5 wherein each axis of rotation is arranged horizontally adjacent and parallel relative to one another.

11. The food processing apparatus according to claim 5 wherein the interior chamber of the tank includes a generally cylindrical recessed section for receiving each rotary drum and wherein each recessed section has a contour that corresponds to its respective rotary drum.

12. The food processing apparatus according to claim 5 wherein each of the at least two rotary drums is submerged in the liquid and the predetermined depth of submersion is no more than about 4 inches.

* * * * *